United States Patent
Ozawa et al.

(10) Patent No.: US 7,944,190 B2
(45) Date of Patent: May 17, 2011

(54) CONTROL CIRCUIT OF POWER SUPPLY UNIT WHICH CONTROLS OUTPUT POWER OF EXTERNAL POWER SUPPLY BASED UPON CURRENT FROM THE EXTERNAL POWER SUPPLY, POWER SUPPLY UNIT AND CONTROL METHOD THEREOF

(75) Inventors: Hidekiyo Ozawa, Kasugai (JP); Morihito Hasegawa, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 608 days.

(21) Appl. No.: 11/889,636

(22) Filed: Aug. 15, 2007

(65) Prior Publication Data

US 2008/0052550 A1  Feb. 28, 2008

(30) Foreign Application Priority Data

Aug. 22, 2006  (JP) .................................. 2006-225074

(51) Int. Cl.
*G05F 1/565* (2006.01)

(52) U.S. Cl. ..................... 323/229; 323/906; 323/285

(58) Field of Classification Search .................. 323/299, 323/300–302, 285, 906; 363/50, 56.03, 56.07, 363/56.1; 320/165

See application file for complete search history.

(56) References Cited

U.S. PATENT DOCUMENTS

| | | | |
|---|---|---|---|
| 5,881,082 A | 3/1999 | Yabuuchi | |
| 7,473,479 B2 | 1/2009 | Igarashi et al. | |
| 2005/0201768 A1* | 9/2005 | Tatematsu et al. | 399/69 |

FOREIGN PATENT DOCUMENTS

| | | |
|---|---|---|
| CN | 1053301 C | 6/2000 |
| JP | 06-113477 A | 4/1994 |
| JP | 08-182219 A | 7/1996 |
| JP | 10-271705 A | 10/1998 |
| JP | 10-322931 A | 12/1998 |
| JP | 2000-323177 A | 11/2000 |
| JP | 2005-197008 A | 7/2005 |

* cited by examiner

*Primary Examiner* — Harry Behm
(74) *Attorney, Agent, or Firm* — Arent Fox LLP

(57) ABSTRACT

The control circuit 30 of power supply unit and power supply unit 10 controlling output power with electric power supplied from the external power 15, comprise a monitoring portion 40 monitoring current I1 and voltage outputted from the external power supply 15 and output power of the external power supply 15 and a setting portion e1 which sets an upper limit value of current outputted from the external power supply 15 based on a monitoring result of the monitoring portion 40.

15 Claims, 6 Drawing Sheets

CIRCUIT CONFIGURATION DIAGRAM OF POWER SUPPLY UNIT ACCORDING TO EMBODIMENT OF THE INVENTION

FIG.1 CIRCUIT CONFIGURATION DIAGRAM OF POWER SUPPLY UNIT ACCORDING TO EMBODIMENT OF THE INVENTION

FIG.2 TIMING CHART OF SIGNAL WAVEFORM OF PWM COMPARATOR

FIG.3 GRAPH SHOWING CHANGES IN OUTPUT VOLTAGE AND OUTPUT ELECTRIC POWER WITH RESPECT TO OUTPUT CURRENT OF EXTERNAL POWER SUPPLY

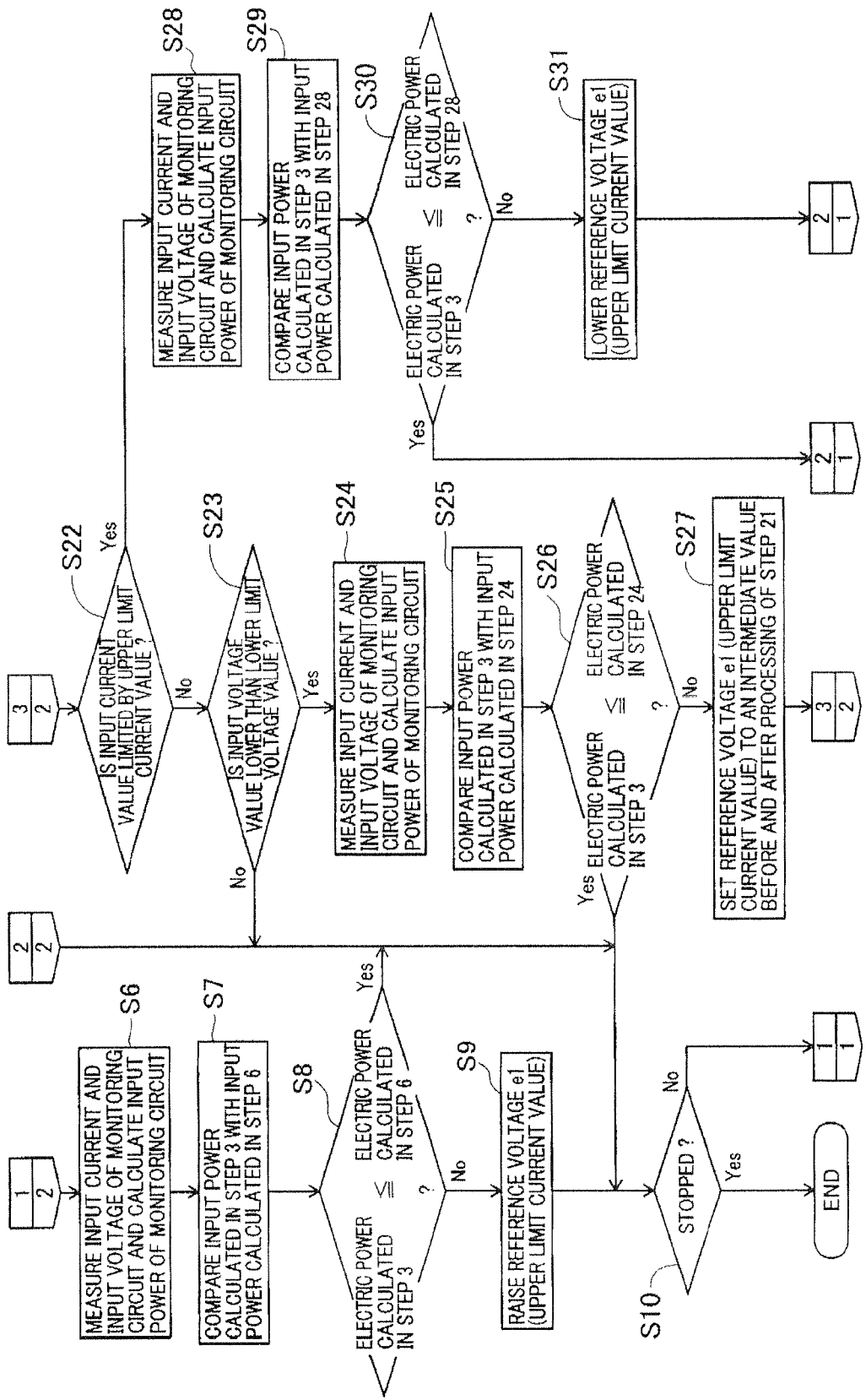
FIG.5 SECOND FLOWCHART CONCERNING PROCESSING WHICH MONITORING CIRCUIT EXECUTES

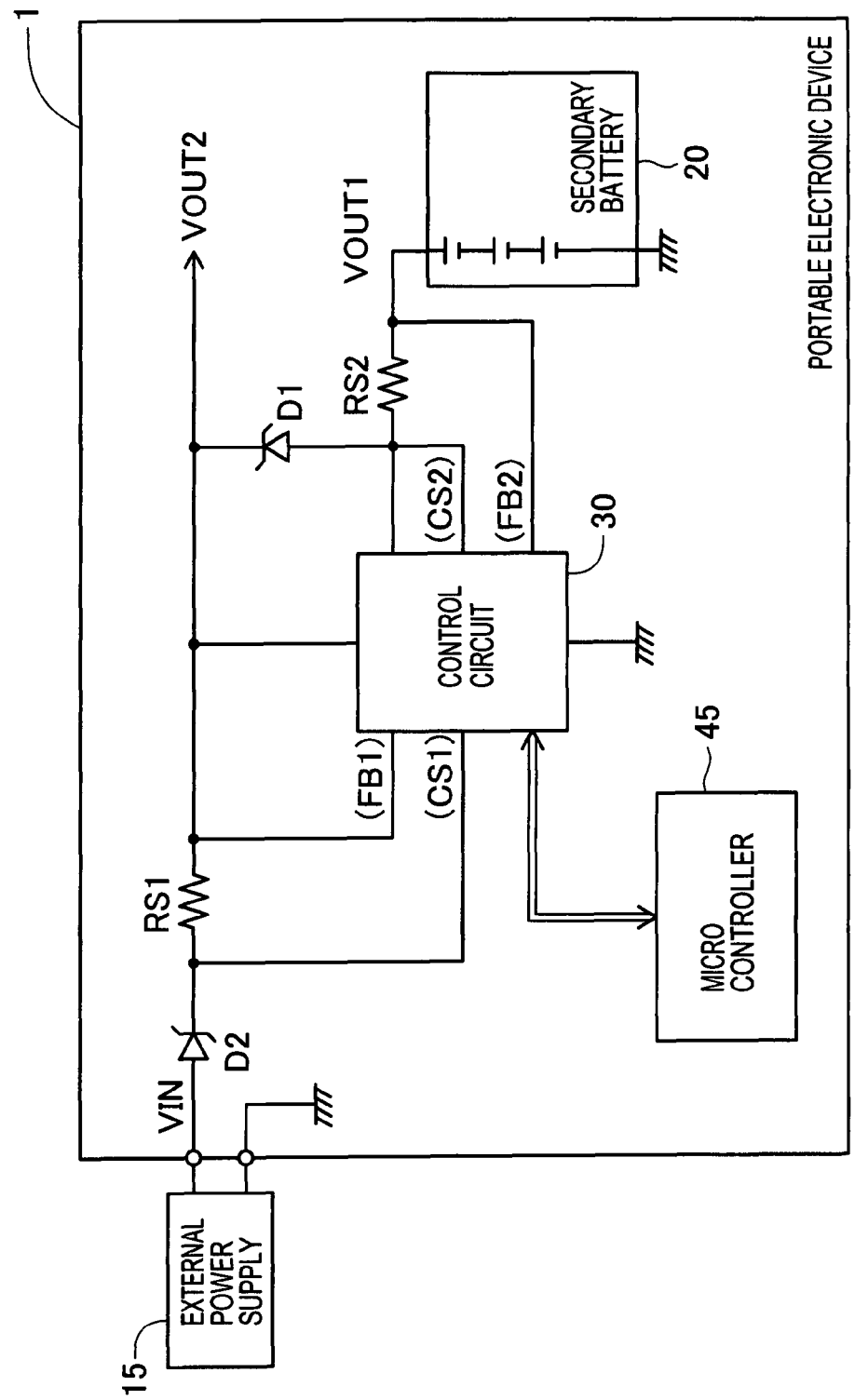
FIG.6 SCHEMATIC DIAGRAM OF PORTABLE ELECTRONIC DEVICE LOADED WITH MONITORING CIRCUIT OF OTHER EMBODIMENT

CONTROL CIRCUIT OF POWER SUPPLY UNIT WHICH CONTROLS OUTPUT POWER OF EXTERNAL POWER SUPPLY BASED UPON CURRENT FROM THE EXTERNAL POWER SUPPLY, POWER SUPPLY UNIT AND CONTROL METHOD THEREOF

CROSS-REFERENCE TO RELATED APPLICATIONS

This application is based upon and claims the benefit of priority from the prior Japanese Patent Application No. 2006-225074 filed on Aug. 22, 2006, the entire contents of which are incorporated herein by reference.

BACKGROUND

1. Field

The present embodiment relates to a control circuit of power supply unit, power supply unit and control method of the same.

2. Description of the Related Art

As disclosed in Japanese unexamined patent publication No. 10(1998)-322931, there has been known a charging circuit capable of supplying electric power to a load circuit and a secondary battery while preventing electric power outputted from an external power supply (AC/DC converter) from exceeding its limit value. This charging circuit includes an input voltage detecting portion, a charging current control portion, and a charging current generating portion. The input voltage detecting portion detects an output voltage of the external power supply. The charging current control portion controls the charging current generating portion corresponding to a voltage detected by the input voltage detecting portion and the charging current generating portion changes the charging current of the secondary battery as described later.

For example, if the input voltage detecting portion detects a maximum output voltage value of the external power supply, the charging current generating portion sets a maximum value of charging current of the secondary battery and if the input voltage detecting portion detects a value between the maximum output voltage value and minimum output voltage value of the external power supply, the charging current generating portion reduces the charging current of the secondary battery. Further, when the input voltage detecting portion detects a minimum output voltage value of the external power supply, the charging current generating portion reduces the charging current of the secondary battery to zero. Then, in the charging circuit disclosed in the Japanese unexamined patent publication No. 10(1998)-322931, as described above, the charging current of the secondary battery is changed corresponding to a voltage value of the external power supply detected by the input voltage detecting portion, so that the output voltage of the external power supply is prevented from falling below the minimum output voltage by increasing/decreasing the charging current of the secondary battery so as to prevent an electric power outputted by the external power supply from exceeding its limit value.

On the other hand, as disclosed in Japanese unexamined patent publication No. 8(1996)-182219, there has been known an electronic apparatus capable of charging the secondary battery with an allowable maximum current of the secondary battery and external power supply in order to charge the secondary battery at the highest speed when corresponding machine is operated. This electronic apparatus includes first to fourth detecting means, a control means and a charging circuit.

The first detecting means detects a difference value between the maximum allowable charging current of the secondary battery and the charging current flowing into the secondary battery and the second detecting means detects a difference value (maximum available current) between the maximum allowable output current of the external power supply, and consumption current of machine. The third detecting means detects a difference value between the maximum available current and the charging current flowing into the secondary battery and the fourth detecting means detects a difference value between the maximum allowable applied voltage and a voltage applied to the secondary battery.

The difference values detected by the first detecting means, the third detecting means and the fourth detecting means are inputted to the control means. The control means determines whether or not the maximum allowable value or the maximum available value is exceeded based on the inputted difference value. If the control means determines that the maximum allowable value or the maximum available value is exceeded, it controls the charging circuit so that the charging circuit reduces the charging current flowing into the secondary battery so as to turn the difference value which is a basis for determining that the maximum allowable value or the maximum available current is exceeded to zero.

Contrary to this, if the control means determines that the maximum allowable value or the maximum available value is not exceeded, it specifies a difference value nearest zero and then, the charging circuit increases the charging current flowing into the secondary battery so as to turn the specified difference value to zero. Then, in the electronic apparatus disclosed in the Japanese unexamined patent publication No. 8(1996)-182219, if the aforementioned difference value is turned to zero, the charging current of the secondary battery maintains a state below the maximum allowable charging current of the secondary battery and consequently, when the electronic apparatus is actuated, the secondary battery can be charged at the highest speed in conditions in which the charging current of the secondary battery is near the maximum allowable current of the secondary battery.

SUMMARY

According to a first aspect and a second aspect of the present embodiment, there are provided a control circuit of power supply unit and a power supply unit respectively, the control circuit and the power supply unit for controlling output voltage with electric power supplied from an external power supply, comprising a monitoring portion monitoring current and voltage outputted from the external power supply and the output power of the external power supply and a setting portion setting the upper limit value of current outputted from the external power supply based on a result of monitoring by the monitoring portion.

BRIEF DESCRIPTION OF THE DRAWINGS

FIG. 5 is a second flow chart thereof; and

FIG. 6 is a schematic diagram of a portable electronic device loaded with a monitoring circuit of other embodiment.

DETAILED DESCRIPTION OF THE PREFERRED EMBODIMENTS

Conventionally, an AC/DC converter has been used as an external power supply, the AC/DC converter being capable of increasing output current with output voltage maintained at a constant level so as to increase output power. However, in recent years, fuel battery or solar battery is sometimes used as the external power supply.

The external power supply using the fuel battery or the like has a characteristic that the output voltage is dropped by an internal resistance or the like accompanying an increase of the output current. Then, it can be considered that the external power supply using the fuel battery or the like cannot maintain the output voltage at a constant level even when the output current is increased so that it cannot increase the output power, different from the aforementioned AC/DC converter.

Further, in the external power supply using the fuel battery or the solar battery, it is considered that the output power is lowered at low temperatures or on a rainy day and the output power is deflected and not stabilized by being affected by the temperature or hours of sunshine.

The present embodiment has been accomplished in views of these circumstances and an object of the embodiment is to provide a control circuit of power supply unit, a power supply unit and control method thereof capable of increasing the output power of the external power supply and bringing it close to the maximum value by controlling current outputted from the external power supply.

Figure 1:
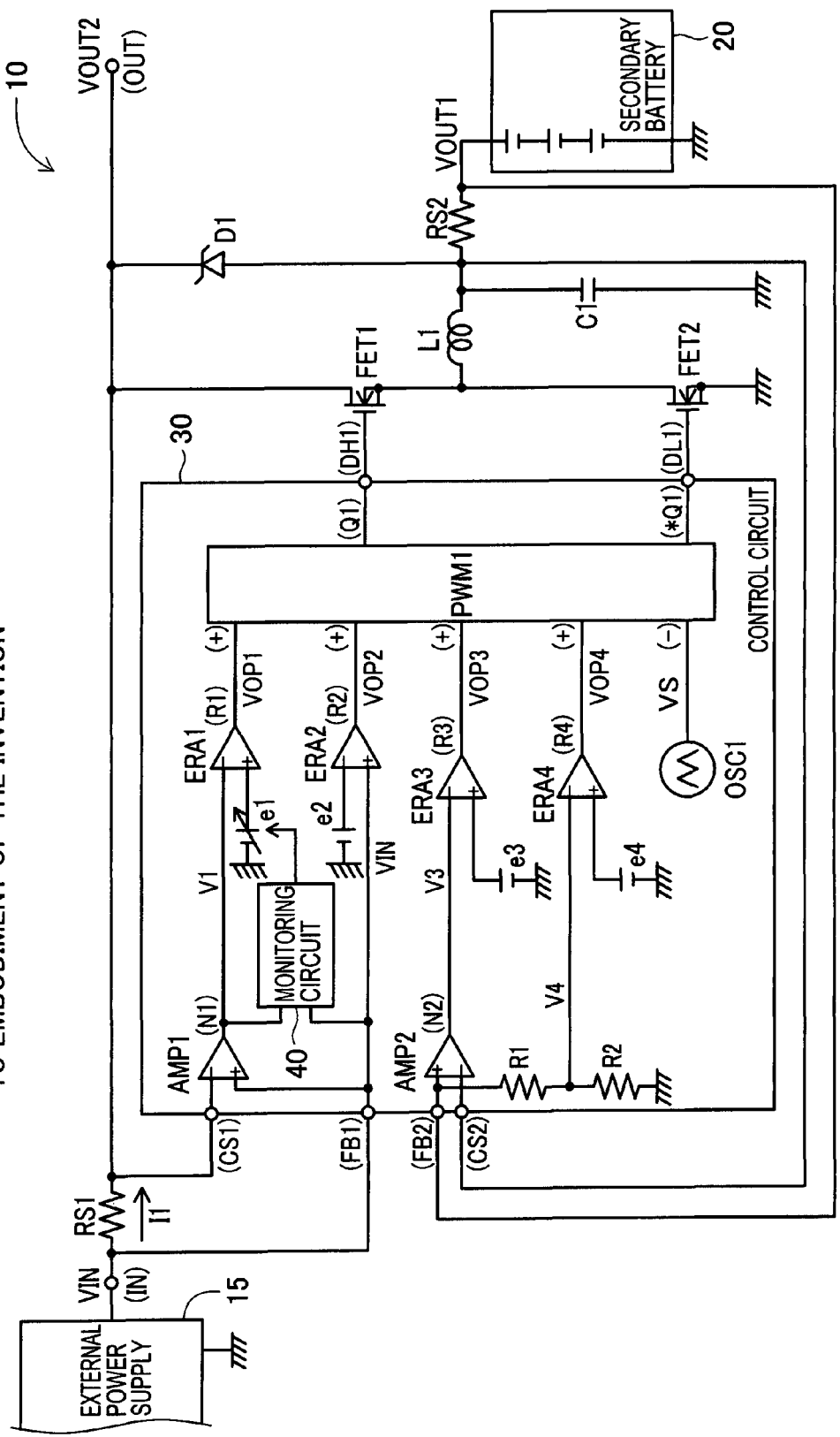
FIG. 1 is a circuit configuration diagram of a power supply unit according to an embodiment of the present embodiment.

The preferred embodiments will be described with reference to FIGS. 1-5. FIG. 1 is a circuit configuration diagram of a power supply unit 10 of this embodiment. The power supply unit 10 includes a main switching transistor FET1, a synchronous side switching transistor FET2, chalk coil L1, capacitor C1, sense resistors RS1 and RS2, protective diode D1 and control circuit 30.

The drain of the main switching transistor FET1 is connected to an input terminal (IN) through the sense resistor RS1. An external power supply 15 is connected to the input terminal (IN). DC input voltage VIN is applied to the drain of the main switching transistor FET1 through the input terminal (IN) by the external power supply 15. In this embodiment, the external power supply 15 is constituted of a fuel battery or a solar battery.

The source of the main switching transistor FET1 is connected to the drain of the synchronous side switching transistor FET2. Further, the source of the main switching transistor FET1 and the drain of the synchronous side switching transistor FET2 are connected to an end of the chalk coil L1. The other end of the chalk coil L1 is connected to an end of the sense resistor RS2 and the other end of the sense resistor RS2 is connected to the secondary battery 20. The secondary battery 20 is constructed to be rechargeable with a plurality of battery cells connected in series.

Further, a diode D1 is connected between a connecting point of the other end of the chalk coil L1 and an end of the sense resistor RS2 and an output terminal (OUT). The capacitor C1 is connected between a connecting point of the other end of the chalk coil L1 and an end of the sense resistor RS2 and the ground.

The control circuit 30 corresponds to a control circuit of the present embodiment, constituted of an IC (integrated circuit). The control 30 includes amplifiers AMP1 and AMP2, a monitoring circuit 40, error amplifiers ERA1-ERA4, triangular wave oscillator OSC1 and PWM comparator PWM1.

An end of the sense resistor RS1 is connected to the input terminal (FB1) of the control circuit 30 and the other end of the sense resistor RS1 is connected to the input terminal (CS1) of the control circuit 30. The input terminal (CS1) is connected to the inverting input terminal of the amplifier AMP1. The input terminal (FB1) is connected to the noninverting input terminal of the amplifier AMP1. The output terminal (N1) of the amplifier AMP1 is connected to the inverting input terminal of the error amplifier ERA1 while it is connected to a first input terminal (not shown) of the monitoring circuit 40. Voltage V1 produced by amplifying voltage generated in the sense resistor RS1 is applied to the inverting input terminal of the error amplifier ERA1. The voltage V1 is inputted to the monitoring circuit 40 through the first input terminal. Reference voltage e1 is applied to the noninverting input terminal of the error amplifier ERA1.

The input terminal (FB1) is connected to the noninverting input terminal of the error amplifier ERA2 while connected to a second input terminal (not shown) of the monitoring circuit 40. The DC input voltage VIN is applied to the noninverting input terminal of the error amplifier ERA2. The DC input voltage VIN is inputted to the monitoring circuit 40 through the second input terminal. Reference voltage e2 is applied to the inverting input terminal of the error amplifier ERA2.

An end of the sense resistor RS2 is connected to the input terminal (CS2) of the control circuit 30 and the other end of the sense resistor RS2 is connected to the input terminal (FB2) of the control circuit 30. The input terminal (CS2) is connected to the inverting input terminal of the amplifier AMP2. The input terminal (FB2) is connected to the noninverting input terminal of the amplifier AMP2. The output terminal (N2) of the amplifier AMP2 is connected to the inverting input terminal of the error amplifier ERA3. Voltage V3 attained by amplifying voltage generated in the sense resistor RS2 is applied to the inverting input terminal of the error amplifier ERA3. Reference voltage e3 is applied to the noninverting input terminal of the error amplifier ERA3.

In the control circuit 30, a resistor R1 and a resistor R2 are connected in series and these resistors R1 and R2 are connected between an input terminal (FB2) of the control circuit 30 and the ground. A connecting point of the resistors R1, R2 is connected to the inverting input terminal of the error amplifier ERA4. Voltage V4 attained by dividing voltage VOUT1 with the resistors R1, R2 is applied to this inverting input terminal. Reference voltage e4 is applied to the noninverting input terminal of the error amplifier ERA4.

Figure 2:
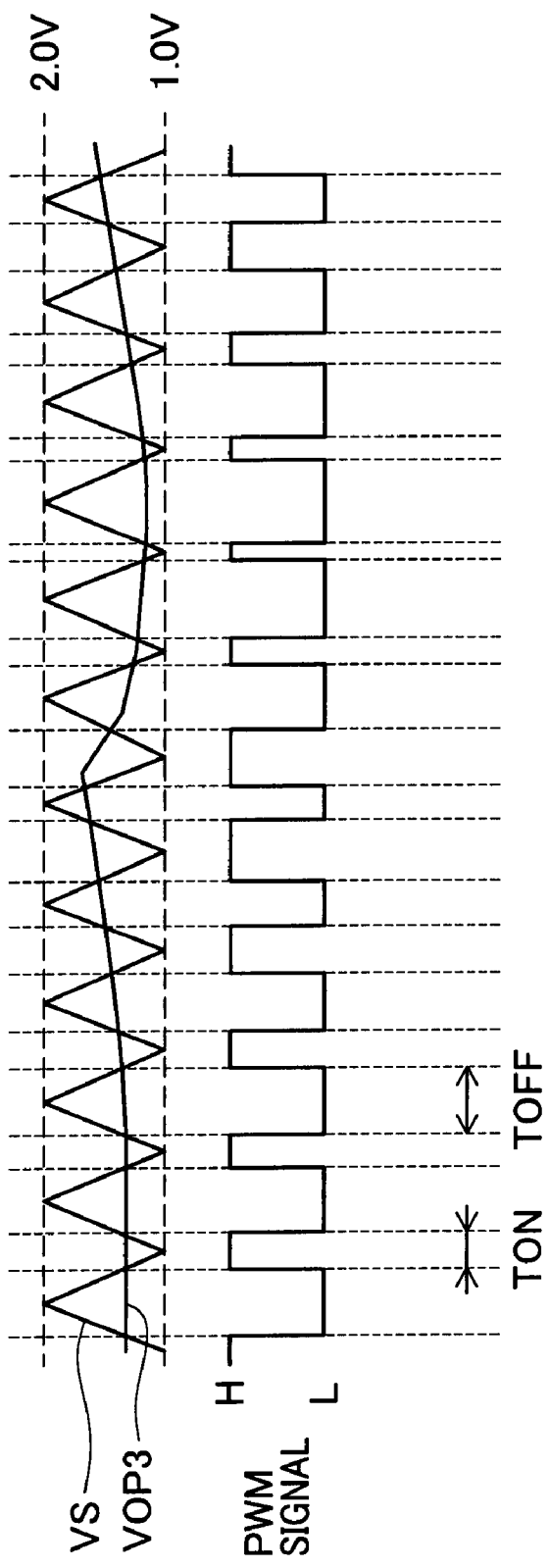
FIG. 2 is a timing chart of signal waveform of a PWM comparator.

The triangular wave oscillator OSC1 is constituted of, for example, an OP amplifier, resistor, capacitor and the like so as to output triangular wave signal VS. The triangular wave signal VS oscillates in a constant voltage value range (1.0 V-2.0 V in this embodiment) as shown in FIG. 2.

The PWM comparator PWM1 comprises four noninverting input terminals (+) and an inverting input terminal (−). The first noninverting input terminal (+) is connected to the output terminal (R1) of the error amplifier ERA1 and the second noninverting input terminal (+) is connected to the output terminal (R2) of the error amplifier ERA2. The third noninverting input terminal (+) is connected to the output terminal (R3) of the error amplifier ERA3 and the fourth noninverting input terminal (+) is connected to the output terminal (R4) of the error amplifier ERA4.

The inverting input terminal (−) of the PWM comparator PWM1 is connected to the triangular wave oscillator OSC1. Further, the output terminal (Q1) of the PWM comparator PWM1 is connected to the gate of the main switching transistor FET1 through the noninverting output terminal (DH1). The inverting output terminal (*Q1) of the PWM comparator PWM1 is connected to the gate of the synchronous side switching transistor FET2 through the inverting output terminal (DL1). The output terminals (Q1) and the inverting output terminal (*Q1) output a different signal.

Next, an operation of the power supply unit 10 of this embodiment will be described. The power supply unit 10 shown in FIG. 1 supplies output voltage VOUT2 to a load circuit connected to the output terminal (OUT) and controls the charging current of the secondary battery 20 by controlling the main switching transistor FET1 and the synchronous side switching transistor FET2 alternately to ON/OFF. The power supply unit 10 is loaded on a portable electronic device (for example, notebook type personal computer) and the secondary battery 20 supplies output voltage VOUT2 to the load circuit through the diode D1 when external power supply 15 is in inoperative condition or the external power supply 15 is not connected to the input terminal (IN).

The error amplifier ERA1 compares the voltage V1 with the reference voltage e1 and outputs error amplifier output voltage VOP1 to the first noninverting input terminal (+). The error amplifier output voltage VOP1 is attained by amplifying an error of the voltage V1 with respect to the reference voltage e1. The error amplifier ERA2 compares the input voltage VIN with the reference voltage e2 and outputs error amplifier output voltage VOP2 to the second noninverting input terminal (+).

The error amplifier ERA3 compares the voltage V3 with the reference voltage e3 and outputs error amplifier output voltage VOP3 to the third noninverting input terminal (+). When the charging current of the secondary battery 20 is maximum allowable value, the value of the reference voltage e3 is set to the same value as the voltage V3 applied to the inverting input terminal of the error amplifier ERA3. The error amplifier ERA4 compares the voltage V4 with the reference voltage e4 and outputs error amplifier output voltage VOP4 to the fourth noninverting input terminal (+). When the voltage VOUT1 turns to a voltage when the secondary battery 20 is fully charged, the value of the reference voltage e4 is set to the same value as the voltage V4 applied to the inverting input terminal of the error amplifier ERA4.

The triangular wave oscillator OSC1 outputs the triangular wave signal VS to the inverting input terminal (−) of the PWM comparator PWM1. The PWM comparator PWM1 compares an error output voltage having the lowest voltage value of the aforementioned error amplifier output voltages VOP1-VOP4 with the triangular wave signal VS. Here, a case where the PWM comparator PWM1 compares the error amplifier output voltage VOP3 with the triangular wave signal VS will be described as an example.

As shown in FIG. 2, when the error amplifier output voltage VOP3 is larger than the voltage value of the triangular wave signal VS, the PWM comparator PWM1 outputs a H-level (high level) PWM signal from the output terminal (Q1). At this time, the PWM comparator PWM1 outputs an inverting PWM signal of L level (low level) from an inverting output terminal (*Q1). On the other hand, when the error amplifier output voltage VOP3 is smaller than the voltage value of the triangular wave signal VS, the PWM comparator PWM1 outputs a PWM signal of L level (low level) form the output terminal (Q1). At this time, the PWM comparator PWM1 outputs an inverting PWM signal of H level (high level) from the inverting output terminal (*Q1).

If the voltage V3 is lower than the reference voltage e3, the error amplifier output voltage VOP3 increases so that a period (TON) in which the PWM signal turns to H level is prolonged. Consequently, the charging current of the secondary battery 20 is increased. Contrary to this, if the voltage V3 is higher than the reference voltage e3, the error amplifier output voltage VOP3 decreases so that a period (TOFF) in which the PWM signal turns to L level (low level) is prolonged. Consequently, the charging current of the secondary battery 20 is reduced.

The PWM signal is inputted to the gate of the main switching transistor FET1 through the noninverting output terminal (DH1). The main switching transistor FET1 turns to ON when the PWM signal is of H level and turns to OFF when the PWM signal is of L level. Further, the inverting PWM signal is inputted to the gate of synchronous side switching transistor FET2 through the inverting output terminal (DL1). The synchronous side switching transistor FET2 turns to OFF when the inverting PWM signal is of L level and turns to ON when the inverting PWM signal is of H level. The PWM signal changes repeatedly between the H level and the L level and at the same time, the inverting PWM signal changes repeatedly between the L level and the H level, so that the charging current of the secondary battery 20 increases or decreases.

Figure 3:
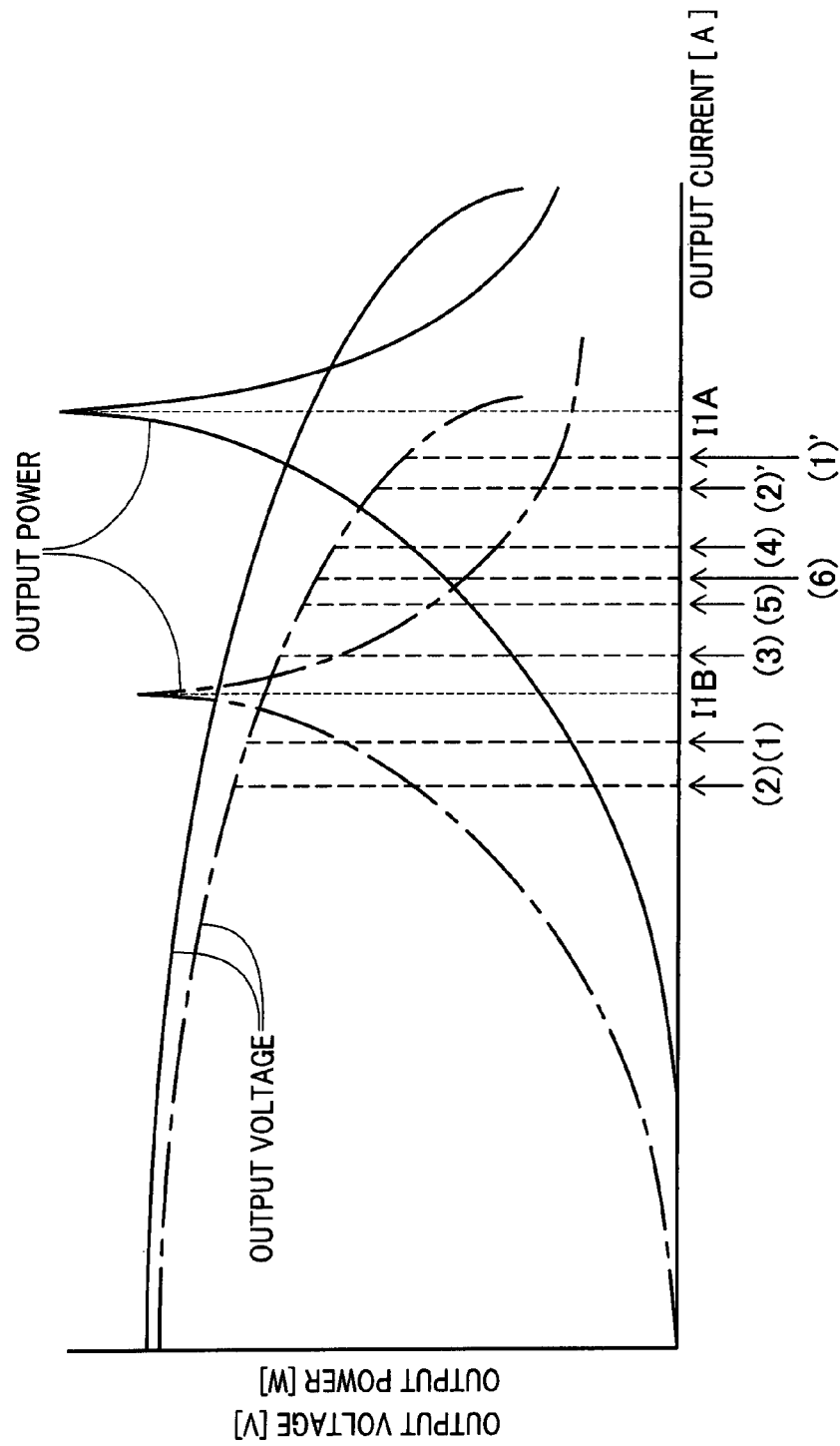
FIG. 3 is a graph showing changes in output voltage and output electric power with respect to the output current of an external power supply.

In the power supply unit 10 of this embodiment, the monitoring circuit 40 controls the value of the reference voltage e1 so as to control voltage generated in the sense resistor RS1. In the power supply unit 10 of this embodiment, when voltage generated in the sense resistor RS1 is controlled, current I1 outputted from the external power supply 15 is controlled so that electric power outputted from the external power supply 15 can be controlled. If the external power supply 15 is constituted of a fuel battery or solar battery, it is affected by temperatures or hours of sunlight so that the output power of the external power supply 15 changes. FIG. 3 shows a state in which the output power of the external power supply 15 is changed corresponding to changes in output current I1 of the external power supply 15. As indicated with a solid line or a dot and dash line in FIG. 3, the output voltage of the external power supply 15 drops with an increase in the output current I1. If the output current—output voltage characteristic of the external power supply 15 is of a solid line, when the output current is I1A, the output power of the external power supply 15 is maximized. If the output current—output voltage characteristic of the external power supply 15 is of a dot and dash line, when the output current is I1B, the output voltage of the external power supply 15 is maximized. In the power supply unit 10 of this embodiment, even when the output power of the external power supply 15 is changed, the monitoring circuit 40 changes the reference voltage e1 so as to control the output current of the external power supply 15, so that the output power of the external power supply 15 can be brought close to the maximum value.

Figure 4:
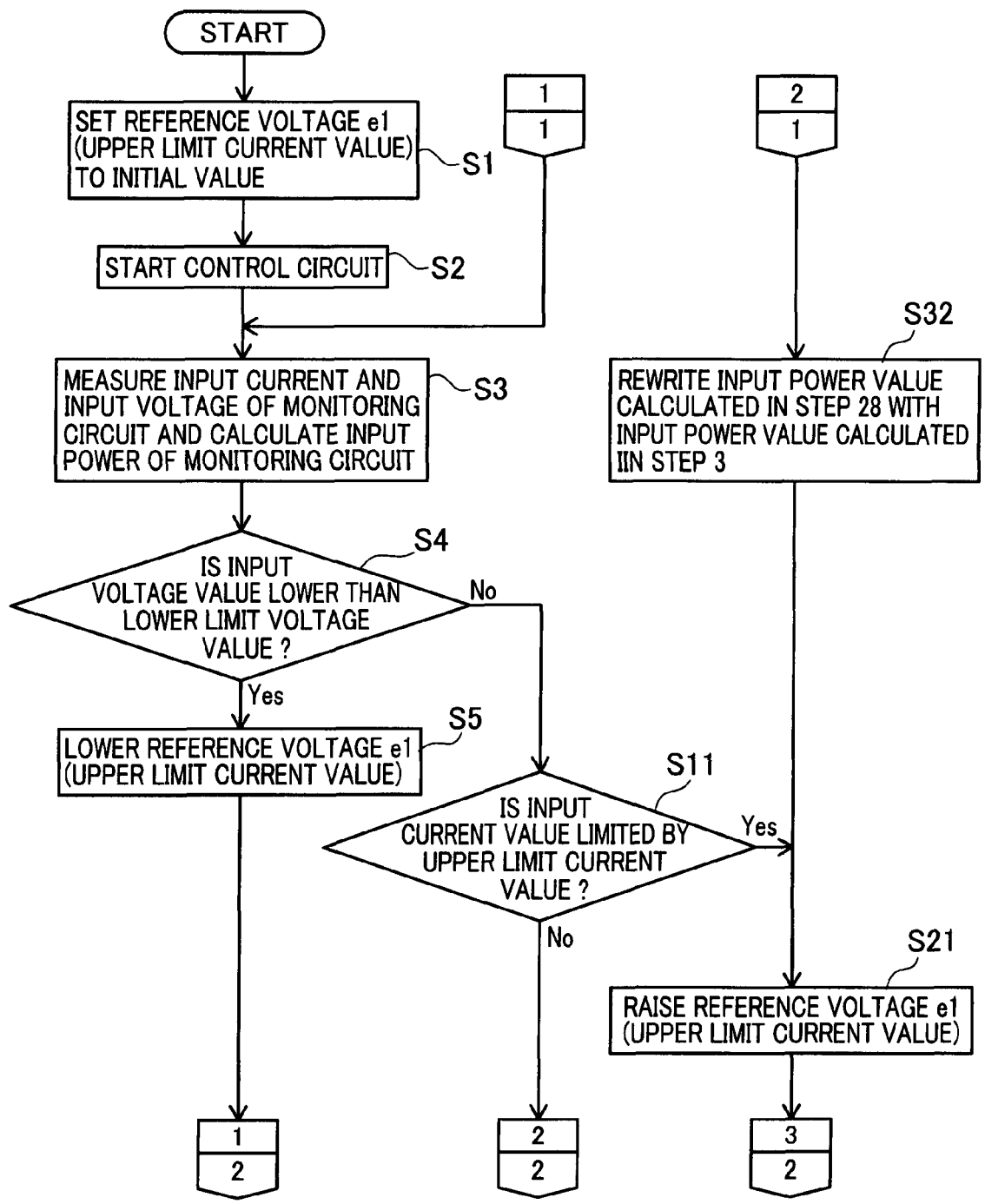
FIG. 4 is a first flow chart of processing which a monitoring circuit executes.

The monitoring circuit 40 of this embodiment is constituted of a micro controller (not shown) and executes each processing indicated in FIGS. 4, 5. When the monitoring circuit 40 is powered on, the value of the reference voltage e1 is set to an initial value in step 1 (S1) as shown in FIG. 4. In this embodiment, the reference voltage e1 is used for setting the upper limit of current outputted from the external power supply 15 and corresponds to the reference signal of the present embodiment. The reference voltage e2 is compared with the voltage VIN by the error amplifier ERA2 and used for setting of a lower limit value of voltage outputted from the external power supply 15. In the meantime, the initial values of the respective voltages e1, e2 are set to an arbitrary value.

The monitoring circuit 40 starts the control circuit 30 in step 2 (S2) following the step 1 (S1). When the control circuit 30 is started, the power supply unit 10 supplies output voltage VOUT2 to a load circuit connected to the output terminal (OUT) by processing of step 2 (S2) and starts charging of the secondary battery 20.

In step 3(S3) after step 2 (S2), the monitoring circuit 40 equipped in the power supply unit 10 measures current inputted to the monitoring circuit 40 and voltage inputted to the monitoring circuit 40 so as to calculate input power of the monitoring circuit 40. In step 3 (S3), the monitoring circuit 40 calculates the input current based on the voltage V1 in FIG. 1, monitors the output current I1 of the external power supply 15 and monitors the output voltage of the external power supply 15 based on the input voltage VIN in FIG. 1. Then, the monitoring circuit 40 multiplies the input current of the monitoring circuit 40 with the input voltage so as to calculate the input power. The monitoring circuit 40 monitors the output power of the external power supply 15 based on calculated input power.

In step 4 (S4) after step 3 (S3), the monitoring circuit 40 determines whether or not the input voltage value measured in step 3 (S3) is lower than the lower limit voltage. In step 4 (S4), the monitoring circuit 40 determines whether the output voltage value of the external power supply 15 drops below the lower limit voltage value so that it is actuated over its own supply capacity based on the determination result.

When it is determined that the input voltage value is lower than the lower limit voltage value (Yes in S4) in step 4 (S4), electric power over the supply capacity of the external power supply 15 is fetched out. In this case, in step 5 (S5), the monitoring circuit 40 lowers the reference voltage e1. Here, as indicated with an arrow in FIG. 1, the monitoring circuit 40 sends a voltage drop instruction signal to the power supply of the reference voltage e1 so as to lower the reference voltage e1. As shown in FIG. 3, in step 5 (S5), the upper limit current value set in the step 1 (S1) is lowered from (1) in the Figure to (2) by lowering the reference voltage e1 so that the output current I1 of the external power supply 15 limited by the upper current value is reduced so as to raise the output voltage of the external power supply 15.

In step 6 (S6) after step 5(S5), as shown in FIG. 5, the monitoring circuit 40 measures current inputted to the monitoring circuit 40 and voltage inputted to the monitoring circuit 40 so as to calculate input power of the monitoring circuit 40 in the same way as step 3 (S3). In step 6 (S6), after the upper limit current value is lowered, the monitoring circuit 40 multiplies current inputted to the monitoring circuit 40 with voltage inputted to the monitoring circuit 40 so as to calculate input power of the monitoring circuit 40 by processing in step 5 (S5).

In step 7 (S7) after step 6 (S6), the monitoring circuit 40 compares the input power calculated in step 3 (S3) with the input power calculated in step 6 (S6). In step 7 (S7), the input power of the monitoring circuit 40 after the upper limit current value is lowered by processing of step 5 (S5) is compared with the input power of the monitoring circuit 40 before the processing of step 5 (S5) is carried out. Consequently, as exemplified in FIG. 3, the output power of the external power supply 15 when the upper limit current value is a value set by the processing of step 5 (S5) ((2) in the Figure) is compared with the output power of the external power supply 15 when the upper current value is a value set before the processing of step 5 (S5) is carried out ((1) in the Figure).

In step 8 (S8) after step 7 (S7), the monitoring circuit 40 determines whether or not the input power calculated in step 3 (S3) is lower than the input power calculated in step 6 (S6). In step 8 (S8), the output electric energy amount of the external power supply 15 when the upper limit current value is a value set before the processing of step 5 (S5) is carried out ((1) in FIG. 3) is compared with the output electric energy amount of the external power supply 15 when the upper limit current value is a value set by the processing of step 5 (S5) ((2) in FIG. 3).

When in step 8 (S8), it is determined that the input power calculated in step 3 (S3) is larger than the input power calculated in step 6 (S6) (No in S8), the monitoring circuit 40 raises the reference voltage e1 in step 9 (S9). Here, as shown with an arrow in FIG. 1, the monitoring circuit 40 sends a voltage raise instruction signal to the power supply of the reference voltage e1 so as to raise the reference voltage e1. In step 9 (S9) of this embodiment, as shown in FIG. 3, the reference voltage e1 is raised to raise the upper limit current value ((2) in the Figure) set in step 5 (S5) thereby bringing back the upper limit current value to a value ((1) in the Figure) set before the processing of step (S5) is carried out, so that the output power of the external power supply 15 is increased (approaches the maximum value). The upper limit current value ((1) in the Figure) set by the processing of step 9(S9) corresponds to the adjustment upper limit value of the present embodiment.

In step 10(S10) after step 9 (S9), the monitoring circuit 40 determines whether or not the power supply unit 10 is to be stopped. In step 10 (S10), the monitoring circuit 40 determines whether or not a unit stop instruction signal (not shown) has been received.

When in step 10 (S10), the monitoring circuit 40 receives the unit stop instruction signal and determines to stop the power supply unit 10 (Yes in S10), it terminates a series of the processing. When in step 10 (S10), the monitoring circuit 40 determines not to stop the power supply unit 10 without receiving the unit stop instruction signal (No in S10), the monitoring circuit 40 executes the processing of the step 3 (S3) immediately. At this time, in step 3 (S3), the upper limit current value is set up with the reference voltage e1 raised by the processing of step 9 (S9) and the monitoring circuit 40 multiplies the input current of the monitoring circuit 40 with the input voltage of the monitoring circuit 40 so as to calculate the input power of the monitoring circuit 40 and monitors the output power of the external power supply 15 based on the calculated input power. The reference voltage e1 is changed after the output electric energy amount of the external power supply 15 when the upper limit current value is a value set before the processing of step 5 (S5) is carried out is compared with the output electric energy amount of the external power supply 15 when the upper limit value is a value set by the processing of step 5 (S5) and used to change the upper limit current value by monitoring the output electric energy amount of the external power supply 15. Thus, the reference voltage e1 corresponds to the setting portion of the present embodiment. Further, the electric energy amount calculated by the monitoring circuit 40 in step 3 (S3) corresponds to a first electric energy amount of the present embodiment.

After step 3 (S3), the monitoring circuit 40 executes a series of processing of the step 4 (S4)—the step 10 (S10). At this time, in step 6 (S6), the upper limit current value is regarded as a value set in step 5 (S5) and the monitoring circuit 40 multiplies the input current of the monitoring circuit 40 with the input voltage of the monitoring circuit 40 so as to calculate the input power of the monitoring circuit 40 and monitors the output power of the external power supply 15 based on the calculated input power. The electric energy amount calculated by the monitoring circuit 40 in step 6 (S6) corresponds to a second electric energy amount of the present embodiment.

In step 8 (S8), as shown in FIG. 3, it is determined that the input power ((2)' in the Figure) calculated in step 6 (S6) is higher than the input power ((1)' in the Figure) calculated in step 3 (S3) (Yes in S8) and if the output power of the external power supply 15 is increased by the processing of step 5 (S5), the increased state of the output power is maintained and then, the processing of step 10 (S10) is executed without executing the processing of step 9 (S9). After that, if it is repeatedly determined that the input voltage value is lower than the lower limit voltage value in step 4 (S4) (Yes in S4), the upper limit current value drops successively by repeating the processing of step 5 so that the output power of the external power supply 15 is increased.

On the other hand, when in the step 4 (S4), it is determined that the input voltage value of the monitoring circuit 40 is higher than the lower limit voltage value (No in S4), the monitoring circuit 40 determines whether or not the input current value of the monitoring circuit 40 is restricted by the upper limit current value in step 11 (S11). In step 11 (S11), the monitoring circuit 40 determines whether the upper limit value of current which can be outputted by the external power supply 15 is suppressed before the limit of the supply capacity of the external power supply 15 is reached so that the external power supply 15 is actuated with an allowance to its supply capacity, based on the determination result.

When in step 11 (S11), it is determined that the input current value is not limited by the upper limit current value (No in S11), the processing of the step 10 (S10) is executed. According to this embodiment, the monitoring circuit 40 determines that the input voltage value is higher than the lower limit voltage value in step 4 (S4) and when it is determined that the input current value is not limited by the upper limit current value in step 11 (S11), the output voltage value of the external power supply 15 does not drop below the lower limit voltage value and consequently, the external power supply 15 is actuated not over its supply capacity and the upper limit value of current which can be outputted by the external power supply 15 does not reach the limit of the supply capacity, so that the power supply unit 10 is supplying output voltage VOUT2 to a load circuit without excess or shortage.

If in step 11 (S11), it is determined that the input current value of the monitoring circuit 40 is not limited by the upper limit current value (Yes in S11), the monitoring circuit 40 raises the reference voltage e1 in step 21 (S21). In this context, the monitoring circuit 40 sends a voltage raise instruction signal to the power supply of the reference voltage e1 so as to raise the reference voltage e1. As shown in FIG. 3, in step 21 (S21), the reference voltage e1 is raised and the upper limit current value of the external power supply 15 is controlled to be raised from (3) to (4) in the Figure.

In step 22 (S22) after step 21 (S21), the monitoring circuit 40 determines whether or not the input current value of the monitoring circuit 40 is limited by the upper limit value. In step 22 (S22), when the reference voltage e1 is raised and the upper limit value of current which can be outputted by the external power supply 15 is increased in step 21 (S21), whether or not the current which can be outputted by the external power supply 15 is limited by the upper limit current value is determined.

If in step 22 (S22), it is determined that the input current value is not limited by the upper limit current value (No in S22), in step 23 (S23), the monitoring circuit 40 determines whether or not the input voltage value of the monitoring circuit 40 is lower than the lower limit voltage value. In step 23 (S23), the monitoring circuit 40 determines whether or not the output voltage value of the external power supply 15 drops below the lower limit voltage value set by the reference voltage e2 so that the external power supply 15 is actuated over its supply capacity by raising the upper limit current value so as to increase the upper limit value of current which can be outputted by the external power supply 15 in step 21 (S21).

When the monitoring circuit 40 determines that the input voltage value is higher than the lower limit voltage value (No in S23) in step 23 (S23), it executes the processing of the step 10 (S10) immediately. When the monitoring circuit 40 determines that the input current value is not limited by the upper limit value in step 22 (S22) and that the input voltage value is higher than the lower limit voltage value in step 23 (S23), the upper limit value of current which can be outputted by the external power supply 15 does not reach the limit of the supply capacity and the output voltage value of the external power supply 15 does not drop below the lower limit voltage value, so that the external power supply 15 is actuated not over its supply capacity and the power supply unit 10 supplies the output voltage VOUT2 to the load circuit without excess or shortage.

On the other hand, when it is determined that the input voltage value is lower than the lower limit voltage value (Yes in S23) in step 23 (S23), in step 24 (S24), the monitoring circuit 40 measures current inputted to the monitoring circuit 40 and voltage inputted to the monitoring circuit 40 like in step 3 (S3) and step 6 (S6) so as to calculate the input power of the monitoring circuit 40. In step 24 (S24), after raising the upper limit current value by the processing of step 21 (S21), the monitoring circuit 40 multiplies the current inputted to the monitoring circuit 40 with the voltage inputted to the monitoring circuit 40 so as to calculate the input power of the monitoring circuit 40.

In step 25 (S25) after step 24 (S24), the monitoring circuit 40 compares the input power calculated in step 3 (S3) with the input power calculated in step 24 (S24). In step 25 (S25), the input power of the monitoring circuit 40 after the upper limit current value is raised is compared with the input power of the monitoring circuit 40 before the processing in step 21 (S21) is carried out by the step 21 (S21). Consequently, as exemplified by FIG. 3, the output power of the external power supply 15 when the current upper limit value is set to a value ((4) in FIG. 4) set by the processing of step 21 (S21) is compared with the output power of the external power supply 15 when the current upper limit value is a value ((3) in FIG. 3) set before the processing of step 21 (S21) is carried out.

In step 26 (S26) after step 25 (S25), the monitoring circuit 40 determines whether or not the input power calculated in step 3 (S3) is lower than the input power calculated in step 24 (S24). Step 26 (S26) determines which is larger the output electric energy amount of the external power supply 15 when the upper limit current value is a value ((3) in FIG. 3) set before the processing of step 21 is carried out or the output electric energy amount of the external power supply 15 when the current upper limit value is a value ((4) in FIG. 3) set by the processing of step 21 (S21). When the upper limit current value is set to a value before the processing of step 21 (S21) is carried out, the electric energy amount calculated by the monitoring circuit 40 in step 3 (S3) corresponds to the first electric energy amount of the present embodiment. Further, when the upper limit current value is a value set by the processing of step 21 (S21), the electric energy amount calculated by the monitoring circuit 40 in step 24 (S24) corresponds to the second electric energy amount of the present embodiment.

When in step 26 (S26), it is determined that the input power calculated in step 3 (S3) is larger than the input power calculated in step 24 (S24) (No in S26), the monitoring circuit 40 set the reference voltage e1 at an intermediate value between a value set before the processing of step 21 (S21) is carried out and a value set by the processing of step 21 (S21) in step 27 (S27). In this context, as indicated with an arrow in FIG. 1, the monitoring circuit 40 sends an intermediate value setting signal to the power supply of the reference voltage e1 and sets the reference voltage e1 at an intermediate value before and after the processing of step 21 (S21). In step 27 (S27) of this embodiment as shown in FIG. 3, the reference voltage e1 is lowered and the upper limit current value is set at an intermediate value ((5) in the Figure) between the upper limit current value ((4) in the Figure) set in step 21 (S21) and the upper limit current value ((3) in the Figure) set before the processing of step 21 (S21) is carried out so as to increase the output power of the external power supply 15 as compared with a state before the upper limit current value is increased and control to bring it close to its maximum value.

After step 27 (S27), the monitoring circuit 40 executes each processing of the step 22 (S22) to the step 27 (S27) repeatedly until it is determined that the input voltage value is higher than the lower limit voltage value (No in S23) in step 23 (S23) Consequently, the monitoring circuit 40 controls so as to bring the output power of the external power supply 15 to the maximum value in conditions in which the output current I1 of the external power supply 15 does not reach the limit of the supply capacity and the output voltage value of the external power supply 15 does not drop below the lower limit voltage value while the external power supply 15 does not exceed its supply capacity.

On the other hand, in step 22 (S22), when it is determined that the input current value of the monitoring circuit 40 is limited by the upper limit current value (Yes in S22), in step 28 (S28), the monitoring circuit 40 measures the input current and input voltage of the monitoring circuit 40 so as to calculate the input power of the monitoring circuit 40 like in the step 24 (S24). In step 28 (S28), after the upper limit current value is raised by the processing of step 21 (S21) like in the step 24 (S24), the monitoring circuit 40 multiplies the input current of the monitoring circuit 40 with the input voltage of the monitoring circuit 40 so as to calculate the input power of the monitoring circuit 40.

In step 29 (S29) after step 28 (S28), the monitoring circuit 40 compares the input power calculated in step 3 (S3) with the input power calculated in step 28 (S28). In step 29 (S29), the input power of the monitoring circuit 40 after the upper limit current value is raised by the processing of step 21 (S21) is compared with the input power of the monitoring circuit 40 before the processing of step 21 (S21) is carried out. In this embodiment, as shown in FIG. 3, the output power of the external power supply 15 when the upper limit current value is a value ((6) in the Figure) set by the processing of step 21 (S21) is compared with the output power of the external power supply 15 when the upper limit current value is a value ((3) in the Figure) set before the processing of step 21 (S21) is carried out.

In step 30 (S30) after step 29 (S29), the monitoring circuit 40 determines whether or not the input power calculated in step 3 (S3) is lower than the input power calculated in step 28 (S28). Step 30 (S30) determines which is larger the output electric energy amount of the external power supply 15 when the upper limit current value is a value ((3) in FIG. 3) set before the processing of step 21 (S21) is carried out or the output electric energy amount of the external power supply 15 when the upper limit current value is a value ((6) in FIG. 3) set by the processing of step 21 (S21). In this context, when the upper limit current value is set to a value before the processing of step 21 (S21) is carried out, the electric energy amount calculated by the monitoring circuit 40 in step 3 (S3) corresponds to the first electric energy amount of the present embodiment. Further, when the upper limit current value is a value set by the processing of step 21 (S21), the electric energy amount calculated by the monitoring circuit 40 in step 28 (S28) corresponds to the second electric energy amount of the present embodiment.

If in step 30 (S30), it is determined that the input power calculated in step 3 (S3) is larger than the input power calculated in step 28 (S28) (No in S30), the monitoring circuit 40 lowers the reference voltage e1 in step 31 (S31) and after that, executes the processing of the step 10 (S10). In step 31 (S31), as indicated with an arrow in FIG. 1, a voltage drop instruction signal is sent to the power supply of the reference voltage e1 so as to drop the reference voltage e1. In step 31 (S31) of this embodiment as shown in FIG. 3, the reference voltage e1 is lowered so as to lower the upper limit current value ((6) in the Figure) set in step 21 (S21) and consequently, the upper limit current value is returned to a value ((3) in the Figure) set before it is changed by the processing of step 21 (S21). As a result, the output power of the external power supply 15 is increased and brought close to the maximum value as compared to a state before the upper limit current value is increased by step 21 (S21).

In step 30 (S30), it is determined that the input power calculated in step 3 (S3) is lower than the input power calculated in step 28 (S28) (Yes in S30) and when the output power of the external power supply 15 is increased by the processing of step 21 (S21), the processing of step 31 (S31) is not executed and the monitoring circuit 40 rewrites the input electric energy of the monitoring circuit 40 calculated by step 28 (S28) to the input electric energy of the monitoring circuit 40 calculated by step 3 (S3) in step 32 (S32). In step 32 (S32), the monitoring circuit 40 carries out processing of memorizing the input power of the monitoring circuit 40 calculated in step 3 (S3) into the RAM. After step 32 (S32), the monitoring circuit 40 executes processing of the step 21 (S21) and subsequently executes a series of the above-described processing.

The monitoring circuit 40 of this embodiment corresponds to the monitoring portion of the present embodiment because the output current I1 and output voltage of the external power supply 15 and the output power of the external power supply 15 are monitored by respective processing of step 3 (S3), step 6 (S6), step 24 (S24) and step 28 (S28). The step 3 (S3), step 6 (S6), step 24 (S24) and step 28 (S28) correspond to the monitoring step of the present embodiment because those steps monitor the output current I1 and output voltage of the external power supply 15 and the output power of the external power supply 15. Further, the step 9 (S9) corresponds to the upper limit setting step of the present embodiment because this step determines which is larger the output electric energy amount of the external power supply 15 when the upper limit value of current outputted from the external power supply 15 is a value set before the processing of step 5 (S5) is carried out or the output electric energy amount of the external power supply 15 when the upper limit value of current outputted from the external power supply 15 is a value set by the processing of step 5 (S5) and changes the reference power supply e1 by monitoring the output electric energy amount of the external power supply 15.

The step 4 (S4) and step 23 (S23) of this embodiment correspond to the voltage detecting portion and first step of the present embodiment because those steps determine whether or not the output voltage value of the external power supply 15 is lower than the lower limit voltage value. The step 11 (S11) and step 22 (S22) of this embodiment correspond to the current detecting portion and second step of the present embodiment because those steps determine whether or not the output current value of the external power supply 15 is suppressed before the limit of the supply capacity of the external power supply 15 is reached.

Step 5 (S5) of this embodiment lowers the reference voltage e1 when it is determined that the input voltage value of the monitoring circuit 40 is lower than the lower limit voltage by the processing of step 4 (S4) so as to control to lower the upper limit value of current outputted from the external power supply 15 and the step 5 (S5) corresponds to the upper limit value changing portion and third step of the present embodiment. When it is determined that the input current value of the monitoring circuit 40 is limited by the upper limit current value in step 11 (S11), step 21 (S21) of this embodiment raises the reference voltage e1 set by the processing of step 9 (S9) so as to control to raise the upper limit value of current outputted from the external power supply 15. The step 21 corresponds to the upper limit changing portion and third step of the present embodiment.

Step 3 (S3) of this embodiment calculates the output electric energy amount of the external power supply 15 when the reference voltage e1 is determined by the processing of step 9 (S9) and corresponds to the electric energy amount calculating portion and fourth step of the present embodiment. Step 6 (S6) of this embodiment calculates the output electric energy amount of the external power supply 15 which compares with the calculated electric energy amount of step 3 (S3) when the reference voltage e1 determined by the processing of step 9 (S9) is changed by the processing of step 5 (S5) and corresponds to the electric energy amount calculating portion and fourth step of the present embodiment. Step 24 (S24) and step 28 (S28) of this embodiment calculate the output electric energy amount of the external power supply 15 which compares with the calculated electric energy amount of step 3 (S3) when the reference voltage e1 determined by the processing of step 9 (S9) is changed by the processing of step 21 (S21) and correspond to the electric energy amount calculating portion and fourth step of the present embodiment.

Step 7 (S7) and step 8 (S8) of this embodiment compares the output electric energy amount calculated by the processing of step 3 (S3) with the output electric energy amount calculated by the processing of step 6 (S6) so as to determine which is larger of the both output electric energy amounts and correspond to the electric energy amount comparing portion and fifth step of the present embodiment. Step 25 (S25) and step 26 (S26) of this embodiment compares the output electric energy amount calculated by the processing of step 3 (S3) when the reference voltage e1 is determined by the processing of step 9 (S9) with the output electric energy amount calculated by the processing of step 24 (S24) when the reference voltage e1 is determined by the processing of step 21 (S21) so as to determine which is larger of the both output electric energy amounts and correspond to the electric energy amount comparing portion and fifth step of the present embodiment. Further, step 29 (S29) and step 30 (S30) determine the magnitudes of the output electric energy amounts like step 26 (S26) and corresponds to the electric energy amount comparing portion and fifth step of the present embodiment.

Step 9 (S9) of this embodiment raises the reference voltage e1 based on a determination result of the magnitudes of the output electric energy amounts in step 7 (S7) and step 8 (S8) to a value different from the value determined by step 5 (S5) and corresponds to the adjusting portion and sixth step of the present embodiment. Step 27 (S27) of this embodiment sets the reference voltage e1 at an intermediate value between the value set by the processing of step 9 (S9) and the value set by the processing of step 21 (S21) based on a result of comparing the output electric energy amount calculated by the processing of step 3 (S3) when the reference voltage e1 is determined by the processing of step 9 (S9) with the output electric energy amount calculated by the processing of step 24 (S24) when the reference voltage e1 is determined by the processing of step 21 (S21). Consequently, the reference voltage e1 can be set to a value different from the value determined by the processing of step 21 (S21) and thus, the step 27 corresponds to the adjusting portion and sixth step of the present embodiment. Further, step 31 (S31) of this embodiment lowers the reference voltage e1 to a value different from the value determined by the processing of step 21 (S21) based on a result of comparing the output electric energy amount calculated by the processing of step 3 (S3) when the reference voltage e1 is determined by the processing of step 9 (S9) with the output electric energy amount calculated by the processing of step 28 (S28) when the reference voltage e1 is determined by the processing of step 21 (S21). The step 31 corresponds to the adjusting portion and sixth step of the present embodiment.

In the power supply unit 10 and control circuit 30 of this embodiment, the monitoring circuit 40 can monitor the current outputted from the external power supply 15 and voltage outputted from the external power supply 15 and the electric power outputted from the external power supply 15 by the processing of the aforementioned step 6 (S6). In the power supply unit 10 and control circuit 30 of this embodiment, if the reference power supply e1 sets up an upper limit value of current outputted from the external power supply 15 by the processing of the step 9 (S9) based on a monitoring result of the monitoring circuit 40, the upper limit of current outputted from the external power supply 15 is changed corresponding to the upper limit value of the set current so as to increase the output power of the external power supply 15. According to the control method of the power supply unit 10 of this embodiment, if the reference power supply e1 sets up an upper limit value of current outputted from the external power supply 15 by the processing of step 9 (S9) based on a monitoring result of the processing of step 6 (S6), the upper limit value of current outputted from the external power supply 15 is changed corresponding to the upper limit value of the set current so as to increase the output power of the external power supply 15.

In the power supply unit 10 and control circuit 30 of this embodiment, the monitoring circuit 40 can determine which is larger the output electric energy amount of the external power supply 15 before the upper limit value of current outputted from the external power supply 15 is changed or the output electric energy amount of the external power supply 15 after the upper limit value of current outputted from the external power supply 15 is changed by the respective processing of step 7 (S7), step 8 (S8), step 25 (S25), step 26 (S26), step 29 (S29) and step 30 (S30). After that, in the power supply unit 10 and control circuit 30 of this embodiment, the monitoring circuit 40 can, by replacing in accordance with the result of the determination the upper limit value of current outputted from the external power supply 15 set by the respective processing of the step 5 (S5) and step 21 (S21) with a value different from the value set by the processing of the step 5 (S5) and step 21 (S21) by the processing of the step 9 (S9), the step 27 (S27) and the step 31 (S31), adjust the upper limit value of current outputted from the external power supply 15 by relating to the magnitude of the output power of the external power supply 15 monitored by the processing of the step 3 (S3), the step 6 (S6), the step 24 (S24) and the step 28 (S28).

According to the control method of the power supply unit 10 of this embodiment, which is larger the output electric energy amount of the external power supply 15 before the upper limit value of current outputted from the external power supply 15 is changed or the output electric energy amount of the external power supply 15 after the upper limit of current outputted from the external power supply 15 is changed can be determined by the processing of step 7 (S7), step 8 (S8), step 25 (S25), step 26 (S26), step 29 (S29) and step 30 (S30). After that, according to the control method of the power supply unit 10 of this embodiment, by replacing the upper limit value of current outputted from the external power supply 15 set by the processing of step 5 (S5) and step 21 (S21) based on a result of determining the magnitude of the output power of the external power supply 15 with a value different from the value set by the processing of the step 5 (S5) and step 21 (S21) through the processing of the step 9 (S9), the step 27 (S27) and step 31 (S31), the upper limit value of current outputted from the external power supply 15 can be adjusted by relating to the magnitude of the output power of the external power supply 15 monitored by the processing of step 3 (S3), step 6 (S6), step 24 (S24) and step 28 (S28).

In the power supply unit 10 and control circuit 30 of this embodiment, when the monitoring circuit 40 determines that the input voltage of the monitoring circuit 40 is lower than the lower limit voltage value by the processing of the step 4 (S4), the output voltage of the external power supply 15 drops and the monitoring circuit 40 can determines that the external power supply 15 is actuated over its supply capacity. In this case, if the monitoring circuit 40 lowers the upper limit value of current outputted from the external power supply 15 set by step 9 (S9) by the processing of the step 5 (S5), it can reduce the current I1 outputted from the external power supply 15, so that the voltage outputted from the external power supply 15 rises. Then, the supply capacity of the external power supply 15 is recovered as the voltage outputted from the external power supply 15 rises, so that electric power which can be fetched out from the external power supply 15 can be increased and brought close to the maximum value.

According to the control method of the power supply unit 10 of this embodiment, if it is determined that the input voltage of the monitoring circuit 40 is lower than the lower limit voltage value through the processing of step 4 (S4), the output power of the external power supply 15 drops and it can be determined that the external power supply 15 is actuated over its supply capacity. In this case, if the upper limit value of current outputted from the external power supply 15 set by step 9 (S9) is lowered by the processing of step 5 (S5), the current I1 outputted from the external power supply 15 can be reduced, so that the voltage outputted from the external power supply 15 rises. Then, the supply capacity of the external power supply 15 is recovered as the voltage outputted from the external power supply 15 rises, so that the electric power which can be fetched out from the external power supply 15 can be increased and brought close to the maximum value.

In the power supply unit 10 and the control circuit 30 of this embodiment, if the monitoring circuit 40 determines that the input current of the monitoring circuit 40 is limited by the upper limit current value by the processing of the step 11 (S11), the upper limit value of current which can be outputted by the external power supply 15 is suppressed before the limit of the supply capacity of the external power supply is reached and it can be determined that the external power supply 15 is actuated with an allowance to the supply capacity. In this case, if the monitoring circuit 40 raises the upper limit value of current outputted from the external power supply 15 set by step 9 (S9) by the processing of the aforementioned step 21 (S21), the output power of the external power supply 15 can be increased with an increase of the current I1 outputted from the external power supply 15, so that the electric power which can be fetched out from the external power supply 15 can be brought close to the maximum value.

According to the control method of the power supply unit 10 of this embodiment, if it is determined that the input current of the monitoring circuit 40 is limited by the upper limit current value by the processing of the step 11 (S11), the upper limit value of current which can be outputted by the external power supply 15 is suppressed before the limit of the supply capacity of the external power supply is reached, so that it can be determined that the external power supply 15 is actuated with an allowance to the supply capacity. In this case, if the upper limit value of current outputted from the external power supply 15 set by step 9 (S9) is raised by the processing of step 21 (S21), the output power of the external power supply 15 can be increased with an increase of the current I1 outputted from the external power supply 15, so that the electric power which can be fetched out from the external power supply 15 can be brought close to the maximum value.

In the power supply unit 10 and control circuit 30 of this embodiment, the monitoring circuit 40 can replace the upper limit current value with the upper limit current value set at the time of calculating the inputted power in step 3 (S3) by the processing of step 9 (S9) under a condition that it determines that the input power of the monitoring circuit 40 calculated in step 3 (S3) is larger than the input power calculated in step 6 (S6) through the processing of the step 8 (S8). Consequently, the electric energy amount (first electric energy amount) calculated when the upper limit current value is replaced with the upper limit current value set at the time of calculating the input power of step 3 (S3) increases over the electric energy amount (second electric energy amount) calculated in step 6 (S6), so that the output power of the external power supply 15 can be brought close to the maximum value.

In the power supply unit 10 and control circuit 30 of this embodiment, the monitoring circuit 40 raises the upper limit value of current outputted from the external power supply set in step 9 (S9) by the processing of the step 21 (S21) and further the monitoring circuit 40 determines that the input current value of the monitoring circuit 40 is limited by the upper limit current value through the processing of the step 22 (S22). After that, under a condition of determining that the input power of the monitoring circuit 40 calculated in step 3 (S3) by the processing of the step 30 (S30) is larger than the input power calculated in step 28 (S28), the upper limit current value can be replaced with a upper limit current value set at the time of calculating the input power in step 3 (S3) by the processing of the step 31 (S31). Then, the monitoring circuit 40 verifies that the output current of the external power supply 15 does not reach the limit of the current supply capacity and the external power supply 15 is actuated with an allowance to the supply capacity and then, the electric energy amount (first electric energy amount) calculated when the upper limit current value is replaced with the upper limit current value set at the time of calculating the input power in step 3 (S3) is increased over the electric energy amount (second electric energy amount) calculated in step 28 (S28) by the processing of step 31 (S31), so that the output power of the external power supply 15 can be brought close to the maximum value.

In the power supply unit 10 and control circuit 30 of this embodiment, if the monitoring circuit 40 determines that the input current value of the monitoring circuit 40 is not limited by the upper limit value by the processing of the step 22 (S22) after the upper limit value of current outputted from the external power supply 15 set by step 9 (S9) is raised by the processing of the step 21 (S21) and determines that the input voltage value of the monitoring circuit 40 is lower than the lower limit voltage value by the processing of step 23 (S23), the monitoring circuit 40 can detect that voltage outputted from the external power supply 15 drops and the external power supply 15 is actuated over its supply capacity, based on the determination result.

Further, in the power supply unit 10 and control circuit 30 of this embodiment, under a condition that the monitoring circuit 40 determines that the input power of the monitoring circuit calculated in step 3 (S3) is larger than the input power calculated in step 24 (S24), the monitoring circuit 40 can replace the upper limit current value with an intermediate value between the upper limit current value set at the time of calculating the input power in step 3 (S3) and the upper limit current value set at the time of calculating the input power in step 24 (S24) through the processing of the step 27 (S27). Then, if the input current value of the monitoring circuit 40 is not limited by the upper limit current value by the processing of step 22 (S22), and the input voltage value of the monitoring circuit 40 is set to a state higher than the lower limit voltage value of the input voltage value by the processing of step 23 (S23), the monitoring circuit 40 can control to a state in which the output current of the external power supply 15 does not reach the limit of the current supply capacity and the external power supply 15 is not actuated over its supply capacity without dropping of the output voltage of the external power supply 15.

In addition, the electric energy amount calculated when the upper limit current value is replaced with the intermediate value is increased over the electric energy amount (second electric energy amount) calculated in step 24 (S24) through the processing of step 27 (S27) so that the output power of the external power supply 15 can be brought close to the maximum value.

The present embodiment is not restricted to the above-described embodiments and may be carried out by modifying part of the configuration within a range not departing from the spirit of the embodiment. Different from the above-described embodiments, the monitoring circuit 40 may send a voltage value adjustment signal to the power supply of the reference voltage e2 to change the reference voltage e2 based on a monitoring result of the output voltage of the external power supply 15 so as to adjust the lower limit voltage value of voltage which can be outputted by the external power supply 15, and then, to increase the electric power which can be fetched out from the external power supply 15 to bring the output power close to the maximum value. Different from the above-described embodiment, the monitoring circuit constituted of a micro controller 45 may be loaded on the portable electronic device 1 such as a notebook type personal computer by disposing outside the control circuit 30 as shown in FIG. 6. A symbol D2 in the Figure denotes a back flow blocking diode. The micro controller 45 shown in FIG. 6 can monitor output current and output voltage of the external power supply 15 and output power of the external power supply 15 by receiving a signal relating to the current and voltage inputted to the control circuit 30 and adjust the upper limit current value of current which can be outputted by the external power supply 15 by changing the reference voltage e1 based on a monitoring result like the above-described embodiment.

The control circuit 30 of the power supply unit 10 of the above-described embodiment may be constituted of a single semiconductor chip or a plurality of the semiconductor chips. Further, the power supply unit 10 may be constituted of a single semiconductor chip or a plurality of the semiconductor chips. Further, the electronic device may employ the power supply unit including the control circuit and DC-DC converter.

According to the control circuit of the power supply unit, the power supply unit and control method of the present embodiment, if the upper limit value of current outputted from the external power supply is set based on a result of monitoring of current and voltage outputted from the external power supply and output power of the external power supply, current outputted from the external power supply can be changed corresponding to the upper limit value of the set current so as to increase or decrease the output power of the external power supply.

What is claimed is:

1. A control circuit of power supply unit for controlling output voltage with electric power supplied from an external power supply, comprising:
    a monitoring portion monitoring current and voltage outputted from the external power supply and the output power of the external power supply; and
    a setting portion setting the upper limit value of current outputted from the external power supply based on a result of monitoring by the monitoring portion,
    wherein the monitoring portion includes:
    a voltage detecting portion detecting that voltage value outputted from the external power supply is smaller than a lower limit value;
    a current detecting portion detecting that current value outputted from the external power supply is limited by the upper limit value;
    an upper limit value changing portion changing the upper limit value set by the setting portion based on a detection result of the voltage detecting portion or the current detecting portion;
    an electric power calculating portion calculating a first electric power from current value and voltage value outputted from the external power supply based on the upper limit value set by the setting portion or a second electric power from current value and voltage value outputted from the external power supply based on the upper limit value changed by the upper limit value changing portion;
    an electric power comparing portion determining which is larger the first electric power or the second electric power calculated by the electric power calculating portion; and
    an adjusting portion, in accordance with a result of determination by the electric power comparing portion, replacing the upper limit value changed by the upper limit value changing portion with an adjustment upper limit value different from the upper limit value.

2. The control circuit of power supply unit according to claim 1 wherein when the voltage detecting portion detects that the voltage value outputted from the external power supply is smaller than the lower limit value, the upper limit value changing portion lowers the upper limit value set by the setting portion.

3. The control circuit of power supply unit according to claim 1 wherein when the current detecting portion detects that the current value outputted from the external power supply is limited by the upper limit value, the upper limit value changing portion raises the upper limit value set by the setting portion.

4. The control circuit of power supply unit according to claim 1 wherein under a condition that the electric power comparing portion determines that the first electric power is larger than the second electric power, the adjusting portion replaces the adjustment upper limit value with an upper limit value set by the setting portion at the time of calculating the first electric power.

5. The control circuit of power supply unit according to claim 1 wherein when the current detecting portion detects that current value outputted from the external power supply is limited by the upper limit value after the upper limit value changing portion raises the upper limit value set by the setting portion, under a condition that the electric power comparing portion determines that the first electric power is larger than the second electric power, the adjusting portion replaces the adjustment upper limit value with an upper limit value set by the setting portion at the time of calculating the first electric power.

6. The control circuit of power supply unit according to claim 1 wherein, under the condition that, after the upper limit value changing portion raises the upper limit value set by the setting portion, the voltage detecting portion detects that voltage value outputted from the external power supply is smaller than the lower limit value, and the electric power comparing portion determines that the first electric power is larger than the second electric power, the adjusting portion replaces the adjustment upper limit value with an intermediate value between upper limit value set by the setting portion at the time of calculating the first electric power and upper limit value set by the setting portion at the time of calculating the second electric power.

7. A power supply unit controlling output voltage with electric power supplied from an external power supply, comprising:
a monitoring portion monitoring current and voltage outputted from the external power supply and the output power of the external power supply; and
a setting portion setting the upper limit value of current outputted from the external power supply based on a result of monitoring by the monitoring portion,
wherein the monitoring portion includes:
a voltage detecting portion detecting that voltage value outputted from the external power supply is smaller than a lower limit value;
a current detecting portion detecting that current value outputted from the external power supply is limited by the upper limit value;
an upper limit value changing portion changing the upper limit value set by the setting portion based on a detection result of the voltage detecting portion or the current detecting portion;
an electric power calculating portion calculating a first electric power from current value and voltage value outputted from the external power supply based on the upper value set by the setting portion or a second electric power from current value and voltage value outputted from the external power supply based on the upper limit value changed by the upper limit value changing portion;
an electric power comparing portion determining which is larger the first electric power or the second electric power calculated by the electric power calculating portion; and
an adjusting portion, in accordance with a result of determination by the electric power comparing portion, replacing the upper limit value changed by the upper limit value changing portion with an adjustment upper limit value different from the upper limit value.

8. The power supply unit according to claim 7 wherein when the voltage detecting portion detects that the voltage value outputted from the external power supply is smaller than the lower limit value, the upper limit value changing portion lowers the upper limit value set by the setting portion.

9. The power supply unit according to claim 7 wherein when the current detecting portion detects that the current value outputted from the external power supply is limited by the upper limit value, the upper limit value changing portion raises the upper limit value set by the setting portion.

10. The power supply unit according to claim 7 wherein under a condition that the electric power comparing portion determines that the first electric power is larger than the second electric power, the adjusting portion replaces the adjustment upper limit value with an upper limit value set by the setting portion at the time of calculating the first electric power.

11. The power supply unit according to claim 7 wherein when the current detecting portion detects that current value outputted from the external power supply is limited by the upper limit value after the upper limit value changing portion raises the upper limit value set by the setting portion, under a condition that the electric power comparing portion determines that the first electric power is larger than the second electric power, the adjusting portion replaces the adjustment upper limit value with an upper limit value set by the setting portion at the time of calculating the first electric power.

12. The power supply unit according to claim 7 wherein, under the condition that, after the upper limit value changing portion raises the upper limit value set by the setting portion, the voltage detecting portion detects that voltage value outputted from the external power supply is smaller than the lower limit value, and the electric power comparing portion determines that the first electric power is larger than the second electric power, the adjusting portion replaces the adjustment upper limit value with an intermediate value between the upper limit value set by the setting portion at the time of calculating the first electric power and the upper limit value set by the setting portion at the time of calculating the second electric power.

13. A control method of power supply unit controlling output voltage with electric power supplied from an external power supply, comprising:
monitoring current and voltage outputted from the external power supply and the output power of the external power supply; and
setting the upper limit value of current outputted from the external power supply based on a result of the monitoring,
wherein the monitoring comprises:
detecting that voltage value outputted from the external power supply is smaller than a lower limit value;
detecting that current value outputted from the external power supply is limited by the upper limit value;
changing the upper limit value set by the setting the upper limit value of current based on a detection result of the detecting voltage value or a detection result of the detecting current value;
calculating a first electric power from current value and voltage value outputted from the external power supply based on the upper limit value set by the setting the upper limit value of current or a second electric power from current value and voltage value outputted from the external power supply based on the upper limit value changed by the changing;

determining which is larger the first electric power or the second electric power calculated by the calculating; and replacing the upper limit value changed by the changing with an adjustment upper limit value different from the upper limit value, in accordance with a result of determination by the determining which is larger the first electric power or the second electric power.

14. The control method of power supply unit according to claim 13 wherein when the detecting voltage value detects that the voltage value outputted from the external power supply is smaller than the lower limit value, the changing lowers the upper limit value set by setting the upper limit value of current.

15. The control method of power supply unit according to claim 13 wherein when the detecting current value detects that the current value outputted from the external power supply is limited by the upper limit value, the changing raises the upper limit value set by the setting the upper limit value of current.

* * * * *